United States Patent [19]

Novotny

[11] Patent Number: 4,848,182

[45] Date of Patent: Jul. 18, 1989

[54] ROTOR BALANCE SYSTEM

[75] Inventor: Rudolph J. Novotny, Stuart, Fla.

[73] Assignee: United Technologies Corporation, Hartford, Conn.

[21] Appl. No.: 94,213

[22] Filed: Sep. 8, 1987

[51] Int. Cl.[4] .......................... F16F 15/22; F01D 5/10
[52] U.S. Cl. .................................. 74/573 R; 416/144; 416/500
[58] Field of Search ..................... 74/573 R, 572, 574; 188/218 XL, 218 A; 416/144, 500; 415/119; 73/460, 469, 487; 464/180; 16/1 R, 1 C; 418/151; 310/51

[56] References Cited

U.S. PATENT DOCUMENTS

| | | | |
|---|---|---|---|
| 414,642 | 11/1889 | Herrick | 416/500 |
| 989,043 | 4/1911 | Pohl | 74/573 R |
| 1,171,172 | 2/1916 | Coppage | 73/487 X |
| 1,209,730 | 12/1916 | Leblanc | 74/573 R |
| 1,803,493 | 5/1931 | Volet | 310/51 X |
| 1,856,786 | 5/1932 | Rice | 416/500 X |
| 2,421,832 | 6/1947 | Cronstedt | 73/487 X |
| 2,964,972 | 12/1960 | Lindsey et al. | 74/573 |
| 3,039,738 | 6/1962 | McDowall et al. | 416/500 X |
| 3,181,835 | 5/1965 | Davis | 416/500 X |
| 3,888,601 | 6/1975 | Glassburn | 416/144 |
| 3,985,465 | 10/1976 | Sheldon et al. | 416/144 X |
| 4,117,742 | 10/1978 | Stein | 74/573 R |
| 4,220,055 | 9/1980 | Dubois et al. | 74/573 R |
| 4,355,957 | 10/1982 | Sifford et al. | 416/500 X |
| 4,477,226 | 10/1984 | Carreno | 416/144 |

FOREIGN PATENT DOCUMENTS

| | | | |
|---|---|---|---|
| 2931193 | 2/1981 | Fed. Rep. of Germany | 416/500 |
| 805371 | 12/1958 | United Kingdom | 74/573 R |

Primary Examiner—Rodney M. Lindsey
Attorney, Agent, or Firm—Edward L. Kochey, Jr.

[57] ABSTRACT

A balance ring (18) which is shrunk fit within each disk (12) of a rotor is selectively ground for detail balance. A plurality of openings (20) through the outer edge of the balance ring receive weights during the asssembly balance of the rotor. A snap ring (42) retains the weights within the openings.

3 Claims, 2 Drawing Sheets

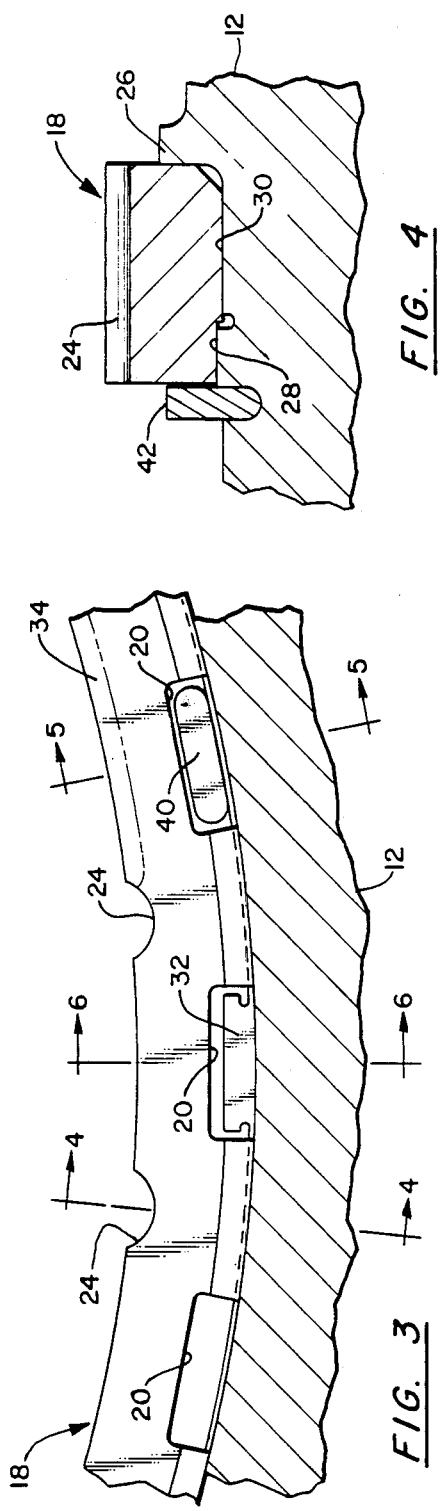
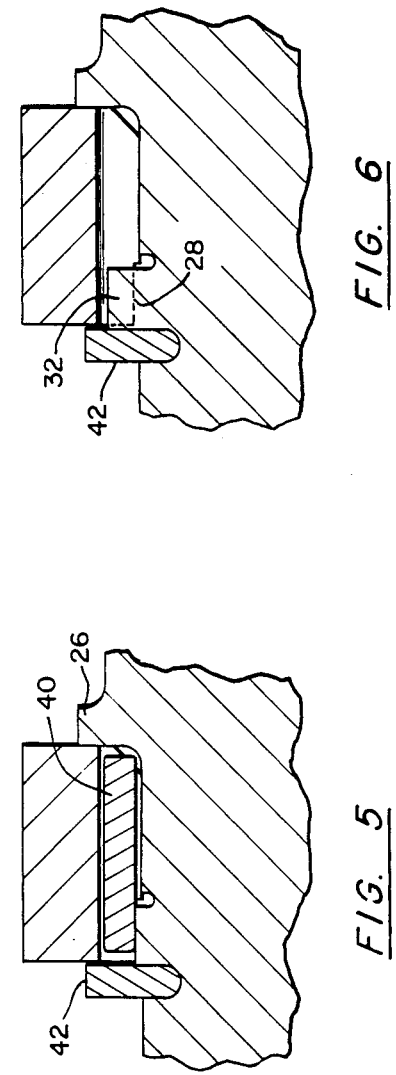
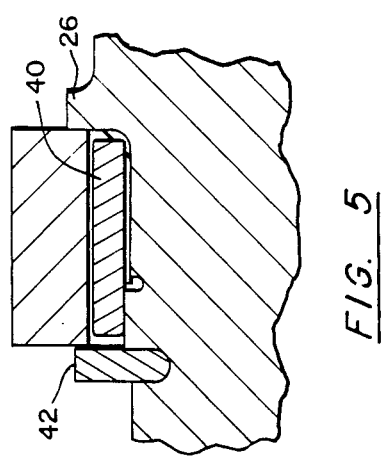

ROTOR BALANCE SYSTEM

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

BACKGROUND OF THE INVENTION

The invention relates to the balancing of bladed rotors and in particular to the balancing of multi-disk rotors.

Bladed rotors such as compressors and turbines of gas turbine engines rotate at a high rate of speed. Dynamic unbalance of such rotors leads to severe vibration reducing the useful life of the component.

It is accordingly known to add or remove material at selected locations to achieve proper balance. Some schemes require machining operations on the disk itself, producing stress concentrations therein to the detriment of the rotor. Some require removal of the disks from the balancing machine for machining with later remounting on the balancing machine. This not only increases the labor involved but variations caused by remounting of the disk make the ultimate balancing difficult.

Other schemes require a plurality of different size weights to accomplish proper balancing.

SUMMARY OF THE INVENTION

A bladed rotor is balanced in two steps. An initial detail balance is achieved on each disk independently of the others. A separate balance ring is interference fit within the disk, with grinding for balance carried out only on the balance ring, thereby avoiding stress concentrations in the disk as well as any stress relieving operations that would be required by machining material from the disk.

The balance ring is mounted so that it might be used for pulling on later disassembly of the rotor. This avoids damage to the disk at such time. The separate nature of the balance ring precludes any cracks in the ring from continuing into the disk.

External openings on the balance ring are used to accept weights during the assembly balance after the disks are assembled to form the rotor. These openings also serve to interact with internal protrusions on the disk to further guard against rotational slipping of the balance ring with respect to the disk.

The large number of external openings make it possible to balance the rotor with the plurality of identically sized weights. A snap ring holds the weights in place and covers both the weights and the openings, thereby reducing windage losses caused by fluid friction over uneven surfaces. The detail balance achieved on each disk is essentially permanent with the ground ring being a shrink fit within the disk. Accordingly, this cannot be disturbed by future maintenance operations. Only the placement of individual weights behind the snap ring can be modified for future maintenance rebalancing operations.

BRIEF DESCRIPTION OF THE DRAWINGS

FIG. 3 is a detail end view of a portion of the balance ring as installed.

FIG. 4 is a view through section 4—4 of FIG. 2 showing the balance ring as installed in the area of the internal scallops.

FIG. 5 is a view through section 5—5 of FIG. 2 showing the balance ring as installed showing an area of the external openings and an installed weight.

FIG. 6 is a view through section 6—6 of FIG. 2 as showing the balance ring as installed in the area of the anti-rotation locks.

DESCRIPTION OF THE PREFERRED EMBODIMENT

Figure 1:
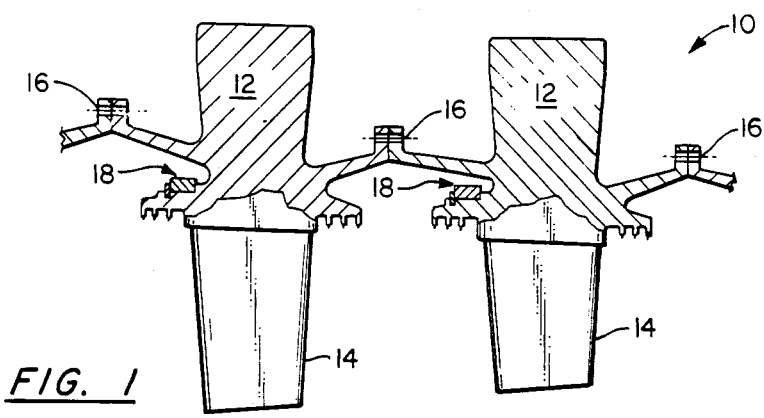
FIG. 1 is an arrangement of several disks to form a rotor.
Figure 2:
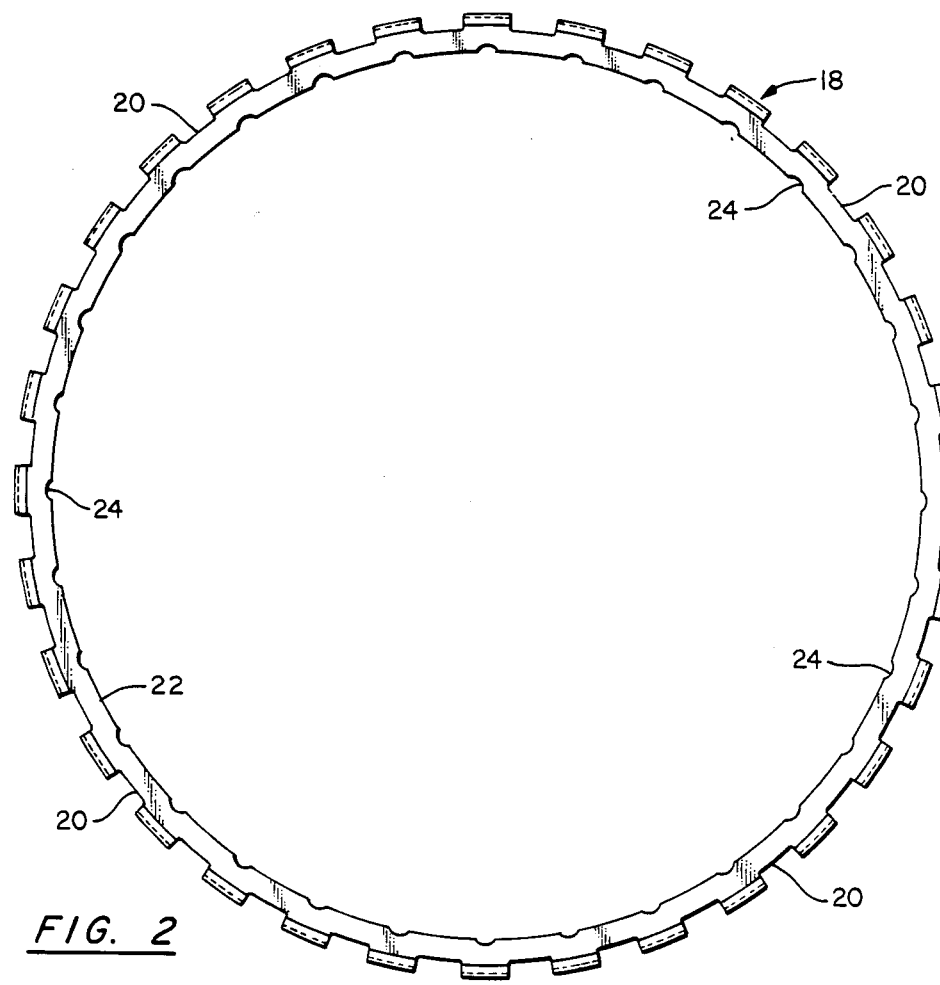
FIG. 2 is a view of the balance ring.

A rotor 10 of a gas turbine engine includes a plurality of disks 12 each carrying a plurality of blades 14. Each disk is bolted 16 to an adjacent disk thereby forming a rotor assembly. A balance ring 18 is shrink fit internally of each disk.

The balance ring 18 contains a plurality of openings 20 at the outer edge. The ring has an inwardly extending portion 22 with scallops 24 located at the inner surface between the external openings 20. The ring has an outside diameter of 5.13 inches and an overall thickness of about 0.3 inches. Scallops 24 are of a depth of 0.04 inches, this being selected so that the remaining material is sufficient to avoid buckling of the balance ring 18 when it is shrink fit within the disk 12. Such shrink fit is accomplished by heating the disk and cooling the balance ring so as to achieve an interference fit of 0.003 inches on the diameter of 5.13 inches.

Both the scallop and the external openings 20 extend through the balance ring its complete thickness of 0.3 inches. The external openings have a length of 0.25 inches and a depth of 0.07 inches.

Referring to FIG. 4 it can be seen that the disk 12 has at a first edge of the balance ring an internal raised lip 26 against which the balance ring 18 is placed. On the second side of the balance ring there is an internal lip 28 on the disk of a height above surface 30 of 0.006 inches. The balance ring 18 has a 0.03 inch corresponding groove on the one edge so that when the ring is shrink fit against surface 30 on the disk 12 it is not only restrained from axial movement by the shrink fit but also by potential interaction with the lip 28. This makes it possible to use the balance ring 18 for pulling the rotors apart during later disassembly without the balance ring slipping off the rotor. All scratches or cracks caused by the pulling operation will be limited to the ring itself thereby protecting the disk. As shown in FIGS. 3 and 6 the disk has several local internal protrusions 32 with these protrusions being limited to the location of lip 28. This provides insurance against rotation of the balance ring within the disk 12.

As described above, the balance ring is placed as a shrink fit within the disk. The disk is then spun at about 900 RPM and the unbalance determined. In order to correct the unbalance, material is ground away by hand from area 34 as illustrated in FIG. 3. The scallops 24 serve as a guide so that the material can be removed with instructions not to exceed the depth of the scallop. This guide avoids excess thinning of the balance ring at the ground location.

After detail balance is complete the plurality of disks are assembled to form the rotor. This rotor is then rotated on a balancing machine to determine the out of balance. Balance weights 40 are placed within openings 20 as required to correct the unbalance.

As shown in FIG. 5, the weight 40 is retained in one direction by lip 26 on the disk. Snap ring 42 fits within the disks on a second side of the balance ring with a snap ring retaining the weights 40 within the openings. Snap ring 42 also covers the various openings as well as the weights thereby reducing windage loss of the rotor.

The detail balance involves the shrink fit of the balance ring within the disk and additionally involves the interaction with lip 28. Accordingly, the detail balance is a permanent arrangement which cannot be removed during later maintenance operations. The assembly balance on the other hand may be corrected as required during later maintenance by removing the snap ring and changing the weights.

I claim:

1. A rotor balance system for a bladed gas turbine engine rotor comprising:
    an assembled plurality of disks, each carrying a plurality of blades;
    a balance ring internally shrink fit to each disk;
    said balance ring having excess internal material beyond that required to avoid buckling during the shrink fit;
    said balance ring selectively ground for establishing a detail balanced condition of each disk;
    a plurality of openings through the outer edge of each balance ring;
    a plurality of balance weights within said openings for establishing a balanced condition of the assembled plurality of disks;
    a snap ring fit internally in each disk adjacent to said balance ring for retaining said balance weights within said openings;
    said disks each having at least one radially extending internal local protrusion in the area of said shrink fit balance ring; and
    said protrusion being located within one of said openings, whereby an anti-rotation lock between said balance ring and said disk is provided.

2. A rotor balance system for a bladed gas turbine engine rotor comprising:
    an assembled plurality of disks, each carrying a plurality of blades;
    a balance ring internally shrink fit to each disk;
    said balance ring having excess internal material beyond that required to avoid buckling during the shrink fit;
    said balance ring selectively ground for establishing a detail balanced condition of each disk;
    a plurality of openings through the outer edge of each balance ring;
    a plurality of balance weights within said openings for establishing a balanced condition of the assembled plurality of disks;
    a snap ring fit internally in each disk adjacent to said balance ring for retaining said balance weights within said openings;
    said disks each having an inner circumferential lip at a first edge of said balance ring, whereby said weights placed within said openings are restrained; and
    said disks each having a slight inner circumferential lip at a second edge of said balance ring, whereby said balance ring is restrained with respect to said disk by said lips in addition to the shrink fit.

3. A rotor balance system as in claim 2:
    said disks each having at least one radially extending internal local protrusions in the area of said shrink fit balance ring;
    said protrusions being located within one of said openings, whereby an anti-rotation lock between said balance ring and said disk is provided; and
    said internal protrusion being located only on said slight inner circumferential lip.

* * * * *